US011262442B2

(12) United States Patent
Takada

(10) Patent No.: US 11,262,442 B2
(45) Date of Patent: Mar. 1, 2022

(54) GHOST REMOVAL METHOD AND RADAR DEVICE

(71) Applicant: MITSUMI ELECTRIC CO., LTD., Tama (JP)

(72) Inventor: Yuji Takada, Tama (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 446 days.

(21) Appl. No.: 15/988,426

(22) Filed: May 24, 2018

(65) Prior Publication Data

US 2018/0341012 A1 Nov. 29, 2018

(30) Foreign Application Priority Data

May 25, 2017 (JP) .............................. JP2017-103503

(51) Int. Cl.
| | | |
|---|---|---|
| *G01S 13/52* | (2006.01) | |
| *G01S 13/931* | (2020.01) | |
| *G01S 13/08* | (2006.01) | |
| *G01S 7/35* | (2006.01) | |
| *G01S 7/292* | (2006.01) | |

(Continued)

(52) U.S. Cl.
CPC ............ *G01S 13/52* (2013.01); *G01S 7/2921* (2013.01); *G01S 7/354* (2013.01); *G01S 7/414* (2013.01); *G01S 7/415* (2013.01); *G01S 13/08* (2013.01); *G01S 13/42* (2013.01); *G01S 13/931* (2013.01); *G01S 2013/93271* (2020.01)

(58) Field of Classification Search
None
See application file for complete search history.

(56) References Cited

U.S. PATENT DOCUMENTS

| | | | | |
|---|---|---|---|---|
| 2003/0179129 A1* | 9/2003 | Tamatsu | ................. | G01S 7/354 342/70 |
| 2006/0268111 A1* | 11/2006 | Zhang | ................. | G01S 3/7864 348/169 |
| 2013/0162462 A1 | 6/2013 | Lehning | | |

(Continued)

FOREIGN PATENT DOCUMENTS

| | | |
|---|---|---|
| JP | 2001-116839 A | 4/2001 |
| JP | 2003269955 A | 9/2003 |

(Continued)

OTHER PUBLICATIONS

Japanese Office Action, application No. 2017-103503, dated Mar. 30, 2021.

(Continued)

*Primary Examiner* — Whitney Moore
(74) *Attorney, Agent, or Firm* — WC&F IP

(57) ABSTRACT

A ghost removal method includes steps of detecting, estimating and excluding. In the detecting, a position and a relative speed of a target moving object, and a position of a surrounding stationary object are detected with radio waves. In the estimating, a position and a relative speed of a ghost by the target moving object are estimated based on the detected position and relative speed of the target moving object and the position of the surrounding stationary object. In the excluding, a detected point where the estimated position and the relative speed of the ghost are detected is excluded from a candidate detection point of a moving object which is detected with radio waves.

6 Claims, 8 Drawing Sheets

(51) Int. Cl.
  *G01S 7/41*  (2006.01)
  *G01S 13/42*  (2006.01)

(56)  References Cited

U.S. PATENT DOCUMENTS

2014/0145871 A1* 5/2014 Asanuma .............. G01S 13/723
                                                342/128
2017/0008517 A1* 1/2017 Himi .................... G01S 13/862

FOREIGN PATENT DOCUMENTS

| JP | 2003270342 A | 9/2003 |
| JP | 2008-082974 A | 4/2008 |
| JP | 2009079917 A | 4/2009 |
| JP | 2009-133761 A | 6/2009 |
| WO | 2007/094064 A1 | 8/2007 |
| WO | 2016/003473 A1 | 1/2016 |

OTHER PUBLICATIONS

Decison of Refusal for Japanese Patent Application No. 2017-10353, original and translation dated Mar. 19, 2021.

* cited by examiner

GHOST REMOVAL METHOD AND RADAR DEVICE

CROSS REFERENCE TO RELATED APPLICATIONS

This application is based on Japanese Patent Application (No. 2017-103503) filed on May 25, 2017, the contents of which are incorporated herein by way of reference.

BACKGROUND

The present invention relates to a ghost removal method and a radar device, for example, a ghost removal technique of an in-vehicle radar device.

In the related art, an inter-vehicle distance sensor equipped with a radar device for detecting a target such as a preceding vehicle has been used for an automatic travel control system (ACC) or the like. The radar device included in this inter-vehicle distance sensor irradiates a front side of a vehicle with millimeter-wave radio waves, receives the reflected radio wave from a target, and mixes the received signal generated from the received radio wave with the transmission signal, thereby detecting a relative distance, a relative speed and the like. However, if the radar device erroneously recognizes the ghost generated by the reflection of radio waves as an actual target, there was a possibility that the target could not be recognized correctly.

This ghost will be explained with reference to FIG. 1. In the inter-vehicle distance sensor based on the millimeter wave radar, when a radio wave 12 reflected by a preceding vehicle 11 is reflected by a wall 13 such as a tunnel wall, a soundproof wall, a guard rail, or the like, it may be erroneously recognized that the ghost 14 is traveling in the wall. In order to prevent this erroneous recognition, the conventional inter-vehicle distance sensor copes with the erroneous recognition by recognizing only the vehicle traveling in front of an own-vehicle 15. However, even with such countermeasures, on a curved road or the like, there is a case where a ghost is erroneously recognized as a vehicle traveling in front of the own-vehicle.

As a radar device that prevents ghost from being erroneously recognized as an actual target, for example, there are devices disclosed in Patent Document 1 and Patent Document 2.

In the radar device disclosed in Patent Document 1, a line corresponding to the wall 13 is obtained from a stationary object or the like continuously detected, and all targets located outside the line are deemed as ghosts and erased. In the radar device disclosed in Patent Document 2, a virtual wall is set, and another target at a position symmetrical to the virtual wall is determined to be a ghost.

[Patent Document 1] JP-A-2001-116839
[Patent Document 2] JP-A-2009-133761
[Patent Document 3] JP-A-2008-82974

SUMMARY

An object of the present invention is to provide a ghost removal method and a radar device capable of more appropriately estimating occurrence of ghost and more appropriately removing the ghost.

According to first aspect of the present invention, there is provided a ghost removal method including steps of:

detecting a position and a relative speed of a target moving object, and a position of a surrounding stationary object with radio waves;

estimating a position and a relative speed of a ghost by the target moving object, based on the detected position and relative speed of the target moving object and the position of the surrounding stationary object; and excluding a detected point where the estimated position and the relative speed of the ghost are detected from a candidate detection point of a moving object which is detected with radio waves.

According to second aspect of the present invention, there is provided a radar device including:

a detection unit which detects a position and a relative speed of a target moving object, and a position of a surrounding stationary object, by using radio waves;

a ghost estimation unit which estimates a position and a relative speed of a ghost by the target moving object, based on the detected position and relative speed of the target moving object and the position of the surrounding stationary object; and a ghost removal unit which excludes a detected point at the estimated position and the relative speed of the ghost, from a candidate detection point of a moving object which is detected with radio waves.

DETAILED DESCRIPTION OF EXEMPLIFIED EMBODIMENTS

In the case of using the method of Patent Document 1, since all targets located outside the line corresponding to the wall are regarded as ghosts and erased, an inconvenience arises in a case where there is an object which should not be erased, such as pedestrians, exists.

In addition, in the method of Patent Document 2, although other targets located symmetrically with respect to the wall are determined as ghosts, depending on the situation, ghosts may occur at positions that are not symmetrical with respect to the wall, and there is a risk of insufficiency of the ghost removal.

The present invention has been made in view of the above points, and provides a ghost removal method and a radar device capable of more appropriately estimating occurrence of ghost and more appropriately removing the ghost.

Hereinafter, embodiments of the invention will be described with reference to the drawings.

First, before explaining the specific configuration of the embodiment, the principle of the embodiment will be described.

Figure 1:
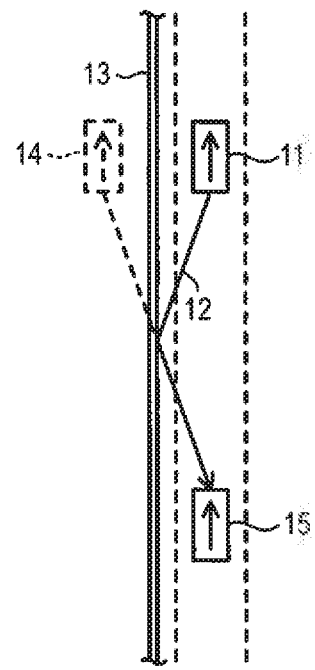
FIG. 1 is a view provided for description of ghost.
Figure 2:
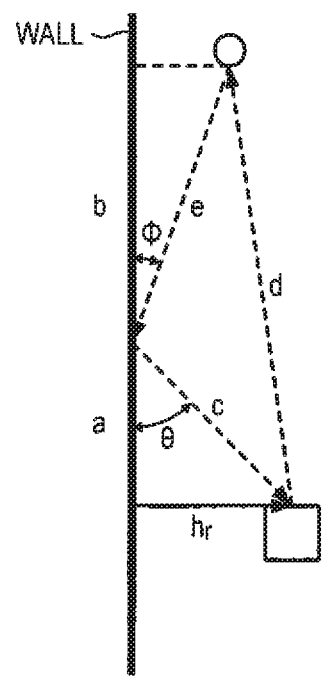
FIG. 2 is a view for describing parameters used in the embodiment.

In FIG. 2, since radar is located at a position of $h_r$ meters from the wall on the left side, and a path is considered which returns to the radar via reflection on the front object and reflection on the left side wall, the distance R measured at this time is expressed by the following expression.

$$R=(d+e+c)/2 \quad \text{[Expression 1]}$$

Also, symbols a, c, b, and d in FIG. 2 can be expressed by the following expressions.

$$a=h_r/\tan(\theta)$$

$$c=\sqrt{h_r^2+a^2}=h_r/\sin(\theta)$$

$$b=e \times \cos(\phi)$$

$$D=180°-\theta-\phi$$

$$d=\sqrt{c^2+e^2-2ce \times \cos(D)} \quad \text{[Expression 2]}$$

Figure 3:
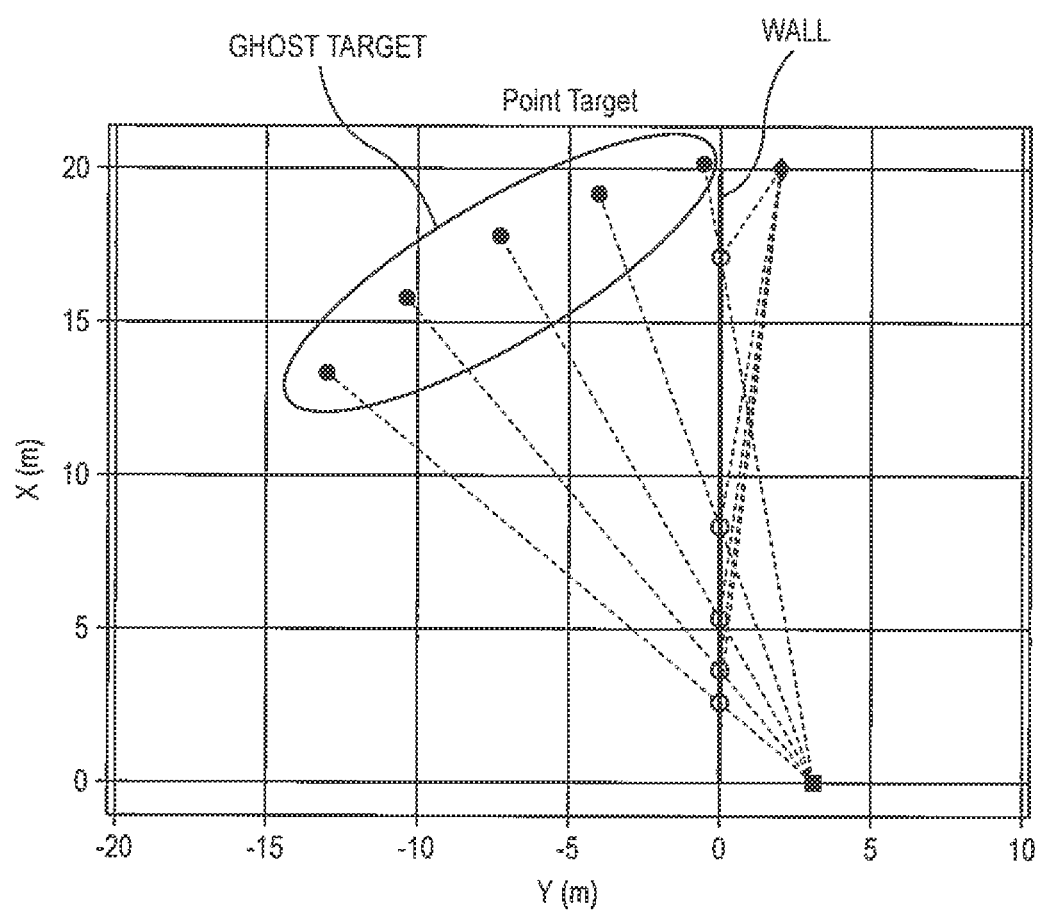
FIG. 3 is a view illustrating how one point of reflection point from a preceding vehicle appears to spread.

FIG. 3 is a view illustrating how one point of the reflection point by the preceding vehicle appears to spread (that is, how the ghost appears). The distance of the ghost target is predominant in the distance of the preceding vehicle, and strictly it is not equidistance, but it looks like a circular arc. In this way, when the distance to the wall is short, the distance to the preceding vehicle is long, and when the propagation path length is dominated by the distance of the preceding vehicle, even if the reflecting object is a single forward point, the ghost target looks big.

Figure 4:
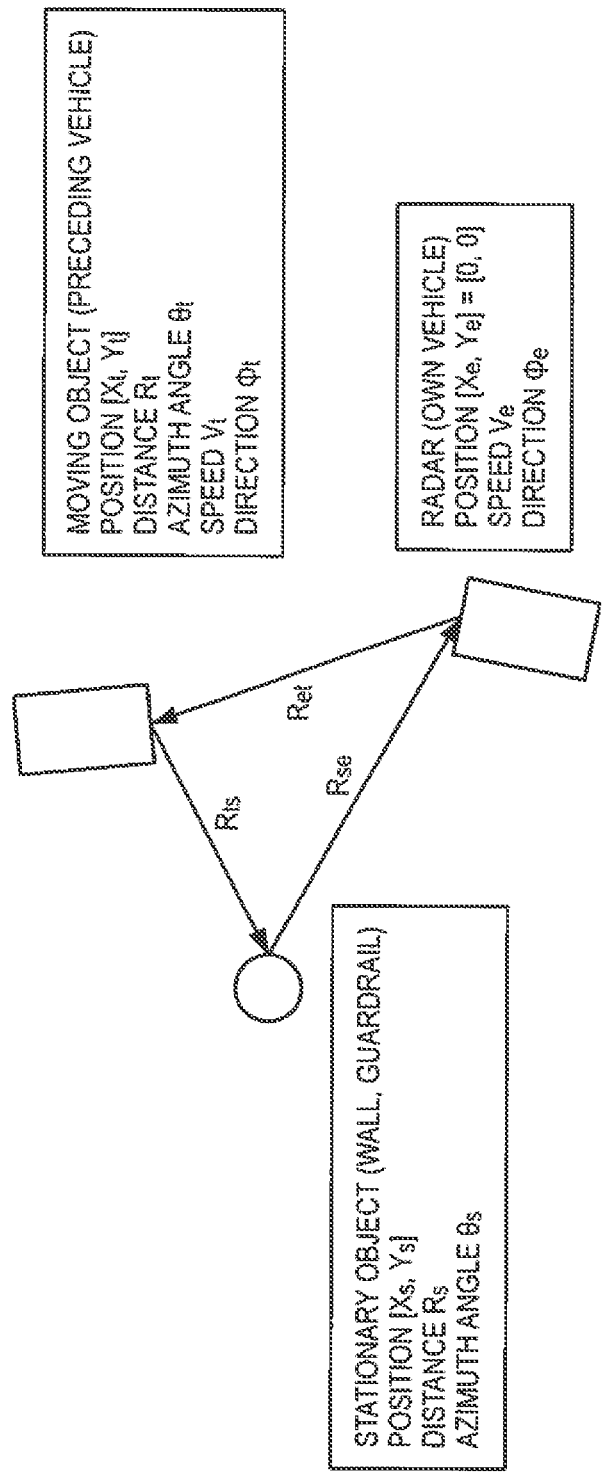
FIG. 4 is a view for describing definitions of parameters of radar (own-vehicle), a moving object (a preceding vehicle), and a stationary object (a wall and a guard rail) used in the embodiment.

Consider the relative speed measured by the radar in a multipath environment including the moving objects and the stationary objects. Here, as illustrated in FIG. 4, the parameters of radar (own-vehicle), the moving object (preceding vehicle), the stationary the object (wall and guard rail) are defined. Further, consider a radio wave propagation path which passes the radar, moving object, the stationary object and the radar in this order.

The distance between the radar and the moving object (that is, the distance between the vehicle (own-vehicle) and the target) can be expressed by the following expression.

$$R_{et} - \frac{x_{et}(v_e\sin(\phi_e)-v_t\sin(\phi_t))+y_{et}(v_e\cos(\phi_e)-v_t\cos(\phi_t))}{R_{et}}(t+T_{PRI}l) \quad \text{[Expression 3]}$$

Here, the position of the own-vehicle is the origin, that is, $x_e=0$, $y_e=0$, and $x_{et}$, $y_{et}$, $R_{et}$ is defined as follows.

$$x_{et}=x_t-0=R_t\sin(\theta_t)$$

$$y_{et}=y_t-0=R_t\cos(\theta_t)$$

$$R_{et}=R_t \quad \text{[Expression 4]}$$

Then, the distance between the radar and the moving object represented by the expression (3) can be expressed by the following expression.

$$=R_t - \frac{R_t\sin(\theta_t)(v_e\sin(\phi_e)-v_t\sin(\phi_t))+R_t\cos(\theta_t)(v_e\cos(\phi_e)-v_s(\cos(\phi_e))}{R_t} \quad \text{[Expression 5]}$$

$$(t+T_{PRI}l) = R_t - [v_e(\sin(\theta_t)\sin(\phi_e)+\cos(\theta_t)\cos(\phi_e))+$$

$$v_t(\sin(\theta_t)\sin(\phi_t)+\cos(\theta_t)\cos(\phi_t)))(t+T_{PRI}l) =$$

$$R_t - [v_e\cos(\theta_t-\phi_e)-v_t\cos(\theta_t-\phi_t)](t+T_{PRI}l)$$

The distance between the stationary object and the own-vehicle can be expressed by the following expression.

$$R_{se} - \frac{x_{se}v_e\sin(\phi_e)+y_{se}v_e\cos(\phi_e)}{R_{se}}(t+T_{PRI}l) \quad \text{[Expression 6]}$$

Here, $x_{se}$, $y_{se}$, and $R_{se}$ are defined as follows.

$$x_{se}=R_s\sin(\theta_s)$$

$$y_{se}=R_s\cos(\theta_s)$$

$$R_{se}=R_s \quad \text{[Expression 7]}$$

Then, the distance between the stationary object represented by expression (6) and the own-vehicle can be expressed by the following expression.

$$R_s-\{v_e\sin(\theta_s)\sin(\phi_e)+v_e\cos(\theta_s)\cos(\phi_e)\}(t+T_{PRI}l)=R_s-v_e\cos(\theta_s-\phi_e)(t+T_{PRI}l) \quad \text{[Expression 8]}$$

The distance between the moving object (target) and the stationary object can be expressed by the following expression.

$$R_{ts} - \frac{x_{ts}v_t\sin(\phi_t)+y_{ts}v_t\cos(\phi_t)}{R_{ts}}(t+T_{PRI}l) \quad \text{[Expression 9]}$$

Here, $x_{ts}$, $y_{ts}$, and $R_{ts}$ are defined as follows.

$$x_{tx}=x_s-x_t=R_s\sin(\theta_s)-R_t\sin(\theta_t) \quad \text{[Expression 10]}$$

$$y_{ts}=y_s-y_t=R_s\cos(\theta_s)-R_t\cos(\theta_t)$$

$$R_{ts}=\sqrt{x_{ts}^2+y_{ts}^2}$$

$$=\sqrt{R_s^2+R_t^2-2R_sR_t(\sin(\theta_s)\sin(\theta_t)+\cos(\theta_s)\cos(\theta_t))}$$

$$=\sqrt{R_s^2+R_t^2-2R_sR_t\cos(\theta_s-\theta_t)}$$

Then, the distance between the moving object (target) and the stationary object represented by Expression (9) can be expressed by the following expression.

[Expression 11]

$$R_{ts} - \frac{(R_s\sin(\theta_s)-R_t\sin(\theta_t))v_t\sin(\phi_t)+(R_s\cos(\theta_s)-R_t\cos(\theta_t))v_t\cos(\phi_t)}{\sqrt{R_s^2+R_t^2-2R_sR_t\cos(\theta_s-\theta_t)}}$$

$$(t+T_{PRI}l) = R_{ts} - \frac{v_s[R_s(\sin(\theta_2)\sin(\phi_t)+\cos(\theta_s)\cos(\phi_t))-R_t(\sin(\theta_t)\sin(\phi_t)+\cos(\theta_t)\cos(\phi_t))]}{\sqrt{R_s^2+R_t^2-2R_sR_t\cos(\theta_s-\theta_t)}}(t+T_{PRI}l) =$$

$$R_{ts} - \frac{v_t(R_s\cos(\theta_s - \phi_t) - R_t\cos(\theta_t - \phi_s))}{\sqrt{R_s^2 + R_t^2 - 2R_sR_t\cos(\theta_s - \theta_t)}}(t + T_{PRI}l) =$$

$$R_{ts} + v_t \frac{R_t\cos(\theta_s - \phi_t) - R_s\cos(\theta_s - \phi_t)}{\sqrt{R_s^2 + R_t^2 - 2R_sR_t\cos(\theta_s - \theta_t)}}(t + T_{PRI}l)$$

From the total of the three routes above, the component of the relative speed seen from the radar can be expressed by the following expression.

$$-v_e\cos(\theta_t - \phi_e) + v_t\cos(\theta_t - \phi_t) - v_e\cos(\theta_s - \phi_e) + \quad \text{[Expression 12]}$$

$$v_t \frac{R_t\cos(\theta_t - \phi_t) - R_s\cos(\theta_s - \phi_t)}{\sqrt{R_s^2 + R_s^2 - 2R_sR_t\cos(\theta_s - \theta_t)}} =$$

$$-v_e\{\cos(\theta_t - \phi_e) + \cos(\theta_s - \phi_e)\} +$$

$$v_t\left\{\cos(\theta_t - \phi_t) + \frac{R_t\cos(\theta_t - \phi_t) - R_s\cos(\theta_s - \phi_t)}{\sqrt{R_s^2 + R_t^2 - 2R_sR_s\cos(\theta_s - \theta_t)}}\right\}$$

The relative speed actually calculated by the radar signal processing is the relative speed obtained by multiplying the expression (12) by the coefficient ½.

The distance of the ghost is half of the sum of the distance between the radar and the preceding vehicle, the distance between the preceding vehicle and the stationary object, the distance between the stationary object and the radar. From the distance and the relative speed of the preceding vehicle measured by the radar and the distance and the relative speed of the stationary object, the distance at which the ghost occurs can be calculated by the following expression.

$$\frac{1}{2}\left\{R_t + R_s + \sqrt{R_t^2 + R_s^2 - 2R_tR_s\cos(\theta_t - \theta_s)}\right\} \quad \text{[Expression 13]}$$

As described above, in the present embodiment, by using the distance, the angle, and the relative speed from the radar to the preceding vehicle, and the distance and the angle from the radar to the stationary object, a measurement point in which the distance from the radar is satisfies a predetermined value (specifically, the expression (13) is satisfied) and in which the relative distance from the radar satisfies a predetermined value (specifically, satisfies the value obtained by multiplying the expression (12) by ½) is estimated as the ghost. Further, the estimated measurement point is excluded from the detection candidate point of the moving object which is detected by using radio waves.

By doing like this, it is possible to more appropriately estimate the occurrence of the ghost compared to the conventional method, and it becomes possible to more appropriately remove the ghost.

Figure 5:
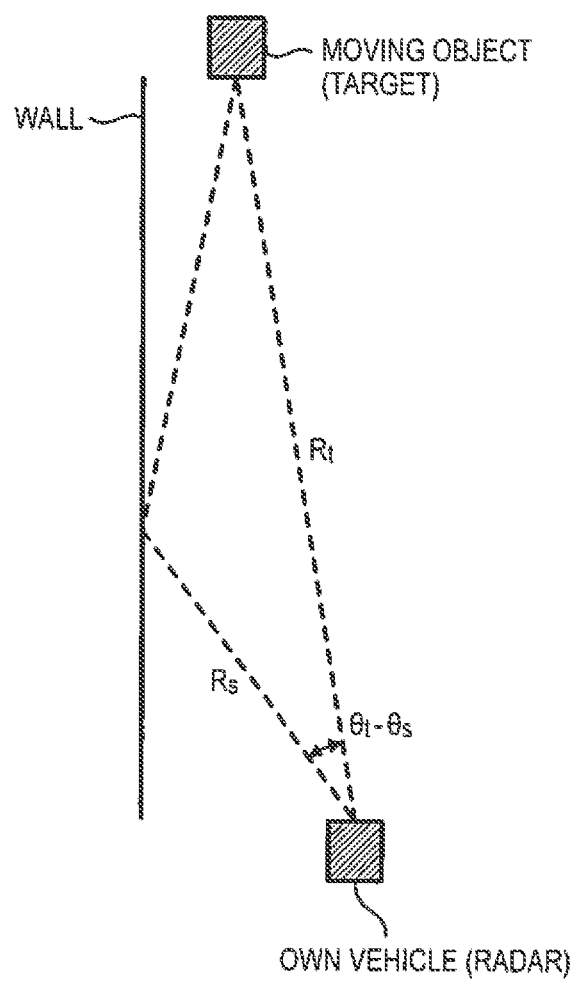
FIG. 5 is a view illustrating a relationship between $R_t$, $R_s$, $\theta_t$, and $\theta_s$.

Incidentally, the relationship of $R_t$, $R_s$, $\theta_t$, and $\theta_s$ in the expression (13) is as illustrated in FIG. 5.

Figure 6:
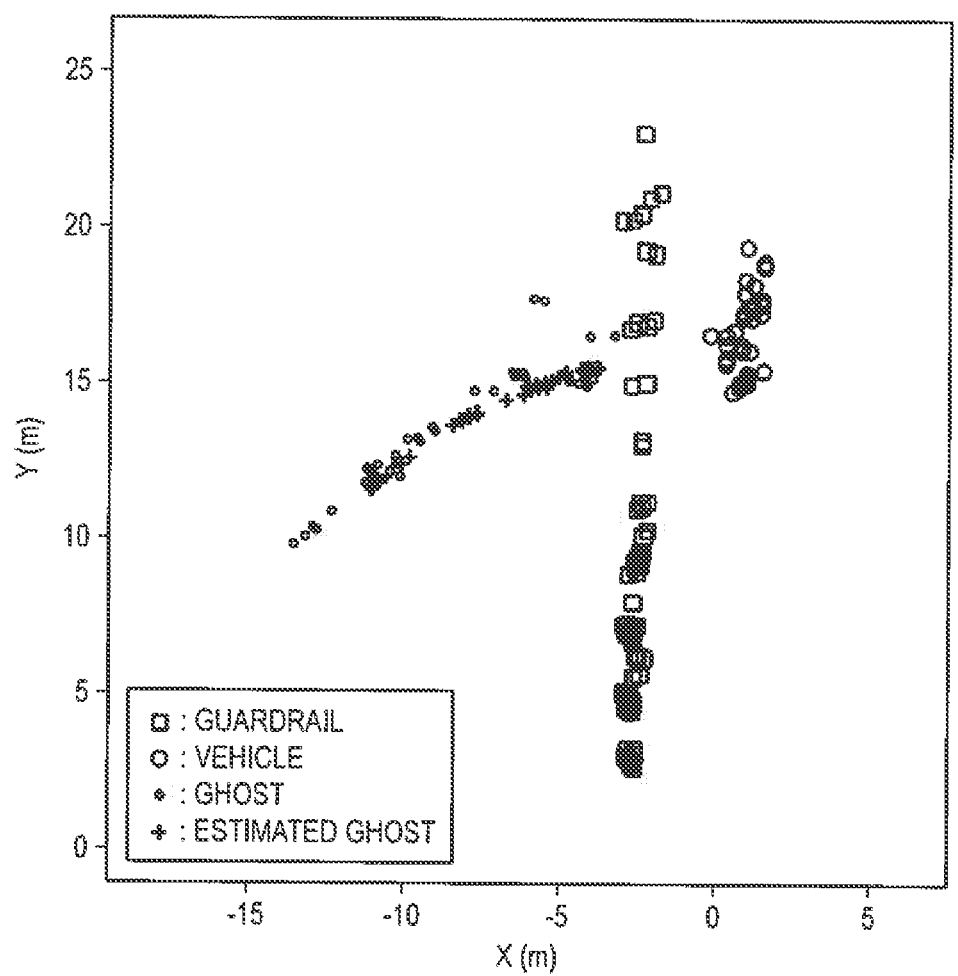
FIG. 6 is a view illustrating detection results of radar in a situation where a preceding vehicle, a guard rail, and a ghost are generated, and illustrates a position of a reflection point in X-Y coordinates.
Figure 7:
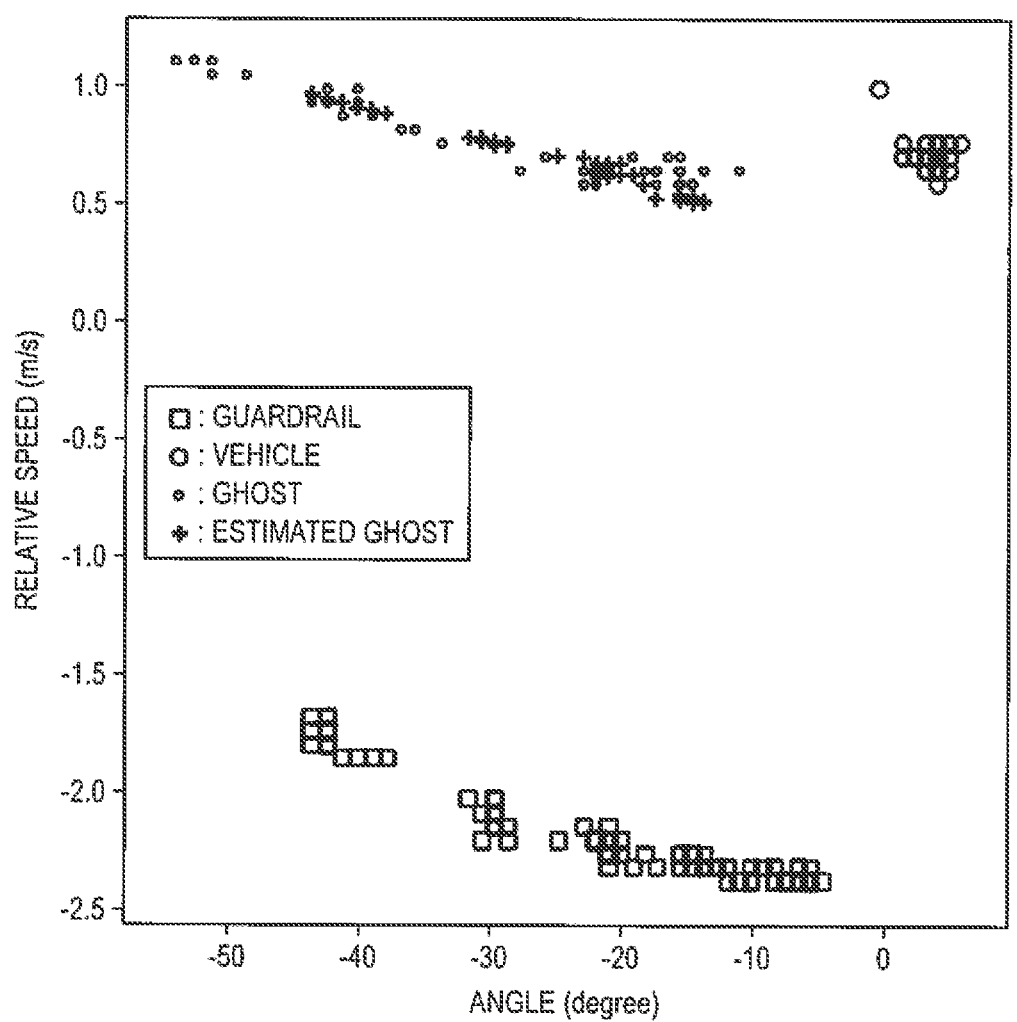
FIG. 7 is a view illustrating detection results of radar in a situation where a preceding vehicle, a guard rail, and a ghost are generated, and is a view illustrating a relationship between an angle and a relative speed.

FIGS. 6 and 7 are views illustrating detection results of radar in a situation in which a preceding vehicle, a guard rail, and a ghost are generated. FIG. 6 illustrates the position of the reflection point on the X-Y coordinate. FIG. 7 illustrates the relationship between the angle and the relative speed. The radar is at the position (0, 0) in FIG. 6. In FIGS. 6 and 7, a square mark indicates a reflection point from a guard rail, a circle indicates a reflection point from a preceding vehicle (that is, a target), a small circle mark indicates a ghost to be measured (that is, an actual ghost), and the + sign indicates the ghost estimated by the above-described method. Here, the estimated point of the ghost indicated by the + sign indicates a point obtained by the above calculation formula, using a point at which the power is strongest among the reflection points n from the preceding vehicle (that is, the target) indicated by a circle, and a point at which the guard rail (here, using the point of distance 10 m or less).

From FIGS. 6 and 7, it can be seen that the ghost estimated by the method of the present embodiment matches the ghost to be measured (that is, the actual ghost).

Figure 8:
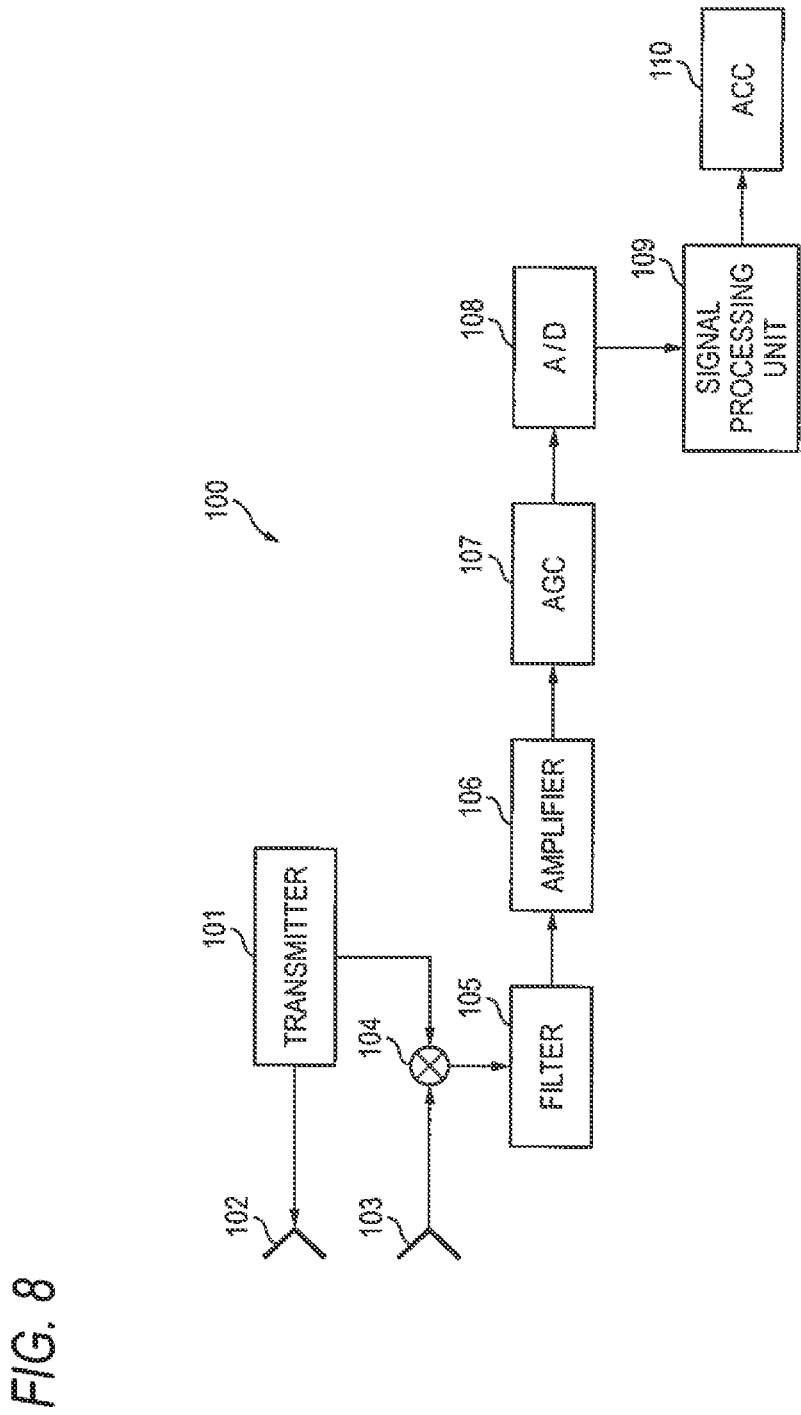
FIG. 8 is a schematic view illustrating AN overall configuration of radar device according to an embodiment.

FIG. 8 is a schematic view illustrating the overall configuration of the radar device according to the embodiment. The radar device 100 includes a transmitter 101, a transmitting antenna 102, a receiving antenna 103, a mixer 104, a filter 105, an amplifier 106, an auto gain controller (AGC) 107, an A/D converter 108, and a signal processing unit 109.

The transmitter 101 performs irradiation of the millimeter wave signal modulated to the ramp waveform from the transmitting antenna 102. Radio waves radiated from the transmitting antenna 102 at a predetermined beam angle are reflected by the target when there is a target such as a preceding vehicle. The receiving antenna 103 receives radio waves reflected by the target. The received signal is mixed with the local oscillation signal from the transmitter 101 by the mixer 104, and input to the signal processing unit 109 via the filter 105, the amplifier 106, the AGC 107, and the A/D converter 108.

The signal processing unit 109 calculates the relative distance, the relative speed, the position, and the like for each target. Since these configurations and operations are the same as those of the conventional radar device, a detailed description thereof will not be provided. The signal processing unit 109 is connected to, for example, an ACC (automatic cruise control device) 110, and the calculation result of the signal processing unit 109 is output to the ACC device 110. The ACC device 110 performs an automatic cruise control based on each target information acquired from the radar device 100.

Here, the signal processing unit 109 of the present embodiment performs a process of excluding the measurement point where the estimated position and the relative speed of the ghost as a ghost, from the candidate detection point of the moving object which is detected by using radio waves using the above-described method.

Figure 9:
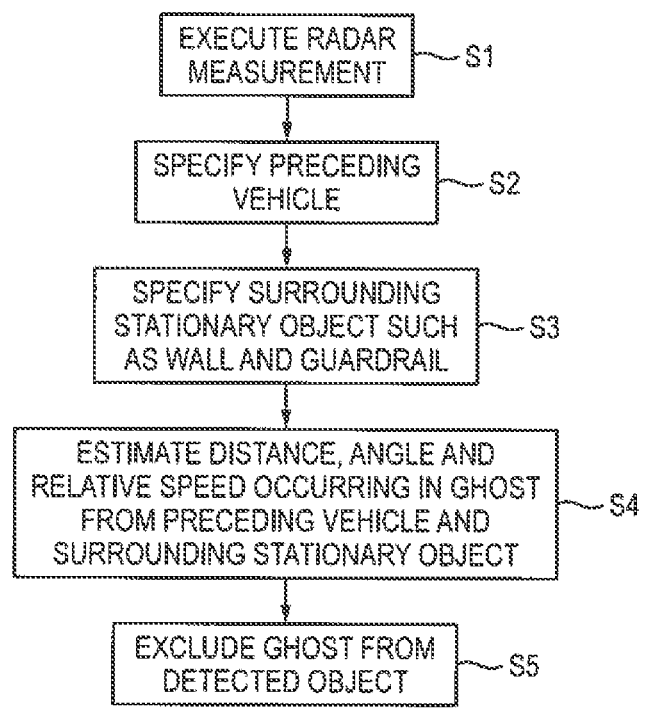
FIG. 9 is a flowchart for describing the ghost removal operation provided by the radar device according to the embodiment.

FIG. 9 is a flowchart for explaining the ghost removal operation provided by the radar device 100 according to the present embodiment.

First, in step S1, the radar device 100 performs radar measurement, that is, irradiation of radio waves from the transmitting antenna 102, receives the reflected radio wave by the receiving antenna 103, and calculates the relative distance, the relative speed, the position and the like for the measurement point by the signal processing unit 109.

Next, in step S2, the radar device 100 specifies which one of the measurement points is the target preceding vehicle, and in step S3, the radar device 100 specifies the surrounding stationary object such as a wall and a guard rail. Here, the surrounding stationary object is a stationary object such as a guide rail or the like which may reflect again the reflected wave from the moving object. Under such circumstances in which such a large number of surrounding stationary objects actually exist, it is preferable to detect only a specific object such as a guide rail as a stationary object. This processing is performed by the signal processing unit 109. Identification of the preceding vehicle which is the target moving object can be carried out, for example, by detecting the measurement point having the highest intensity among the measurement points. Identification of the peripheral the stationary object can be carried out, for example, by detecting a measurement point in which the relative speed is close to v×cos θ from the speed v of the vehicle on which the radar device is mounted and the angle θ of the object (that is, the direction in which radio waves arrive). Incidentally, the identification of the stationary object is described in, for example, Patent Document 3 and the like.

Next, in step S4, the signal processing unit 109 of the radar device 100 estimates the distance, the angle, and the speed at which a ghost occurs, from the preceding vehicle and the surrounding stationary object. That is, based on the detected position and relative speed of the target moving object and the position of the surrounding stationary object, the distance, the angle and the speed at which ghost occurs are estimated, using the above calculation formula.

Next, in step S5, the signal processing unit 109 of the radar device 100 excludes the measurement point where the estimated position and the relative speed of the ghost are detected, from the detected objects (that is, the candidate detection point of the moving object which is detected by using radio waves).

In the above-described embodiment, the transmitter 101, the transmitting antenna 102, the receiving antenna 103, the mixer 104, the filter 105, the amplifier 106, the auto gain controller (AGC) 107, the A/D converter 108, and the signal processing unit 109 function as a detection unit that detects the position and the relative speed of the moving object as the target and the position of the surrounding stationary object, using radio waves. The signal processing unit 109 functions as a ghost estimating unit that estimates the position and the relative speed of the ghost based on the detected position and relative speed of the target moving object and the position of the surrounding stationary object. Further, the signal processing unit 109 also functions as a ghost removal unit that excludes the measurement point where the estimated position and the relative speed of the ghost are detected from the candidate detection point of the moving object that is detected by using radio waves.

As described above, according to the present embodiment, (i) the position and the relative speed of the moving object as the target and the position of the surrounding stationary object are detected using radio waves, (ii) the position and the relative speed of the ghost are estimated based on the detected position and relative speed of the target moving object and the position of the surrounding stationary object, and (iii) the measurement point where the estimated position and the relative speed of the ghost are detected is excluded as a ghost from the candidate detection point of the moving object which is detected using radio waves. Thus, it is possible to more appropriately estimate the occurrence of ghosts as compared with the related art, and to more appropriately remove the ghost. For example, since a speed of a pedestrian or the like behind a wall does not coincide with the speed of the vehicle, it is not necessary to remove the pedestrian.

The above-described embodiment is merely an example of implementation of the invention, and the technical scope of the invention should not be interpreted as being limited thereto. That is, the invention can be practiced in various ways, without departing from the gist or the main features thereof.

In the above embodiment, a case where the ghost removal method and the radar device according to the invention are applied to an in-vehicle radar device to remove the ghost generated when detecting the vehicle ahead of the own-vehicle has been describe. However, the invention is not limited thereto, and can be widely applied as a method for removing ghosts generated when using the radar device, and a radar device using the method. Particularly, this method is effective for eliminating ghosts in a radio wave propagation environment in which a target is a moving object and a stationary object that re-reflects radio waves reflected from the moving object exists.

The present invention can be applied to, for example, an in-vehicle radar device.

According to the invention, it is possible to more appropriately estimate the occurrence of ghosts and to more appropriately remove the ghosts as compared with the related art. For example, since a speed of a pedestrian and the like behind the wall does not coincide with the speed of the vehicle, it is not assumed as a ghost, and is not required to be removed.

What is claimed is:

1. A ghost removal method comprising steps of:
   detecting a position and a relative speed of a target moving object, and a position of a surrounding stationary object with radio waves;
   estimating a position and a relative speed of a ghost based on the detected position and relative speed of the target moving object and the position of the surrounding stationary object, the ghost being generated at a position beyond the surrounding stationary object with respect to the target moving object when the radio waves reflected by the target moving object are reflected by the surrounding stationary object, wherein the position of the ghost is different than any position ever occupied by the target moving object; and
   excluding a detected point where the estimated position and the relative speed of the ghost are detected from a candidate detection point of a moving object which is detected with radio waves.

2. The ghost removal method according to claim 1, wherein
   in the step of estimating the position and the relative speed of the ghost, a distance to the ghost from a radar device is calculated by a following expression:

$$\frac{1}{2}\left\{R_t + R_s + \sqrt{R_t^2 + R_s^2 - 2R_t R_s \cos(\theta_t - \theta_s)}\right\}$$

wherein $R_t$ is a distance from the radar device which emits the radio wave to the target moving object, $R_s$ is a distance from the radar device to a predetermined reflection point on the surrounding stationary object in which a reflected wave from the target moving object is reflected again, and $\theta_t - \theta_s$ is an angle between the target moving object and the reflection point as viewed from the radar device.

3. The ghost removal method according to claim 1, wherein
   in the step of estimating the position and the relative speed of the ghost, the relative speed of the ghost is calculated by a following expression:

$$-v_e \cos(\theta_t - \phi_e) + v_t \cos(\theta_t - \phi_t) - v_e \cos(\theta_s - \phi_e) +$$
$$v_t \frac{R_t \cos(\theta_t - \phi_t) - R_s \cos(\theta_s - \phi_t)}{\sqrt{R_s^2 + R_t^2 - 2R_s R_t \cos(\theta_s - \theta_t)}} = -v_e \{\cos(\theta_t - \phi_e) + \cos(\theta_s - \phi_e)\} +$$

-continued $$v_t\left\{\cos(\theta_t - \phi_t) + \frac{R_t\cos(\theta_t - \phi_t) - R_s\cos(\theta_s - \phi_t)}{\sqrt{R_s^2 + R_t^2 - 2R_sR_t\cos(\theta_s - \theta_t)}}\right\}$$

wherein, $v_e$ is a speed of a radar device which emits the radio wave, $\phi_e$ is a direction of the radar device, $v_t$ is the speed of the target moving object, $\theta_t$ is an azimuth angle of the target moving object, $R_t$ is the distance from the radar device to the target moving object, $\theta_s$ is an azimuth angle of a predetermined reflection point on a surrounding stationary object on which a reflected wave from the target moving object is reflected again, and $R_s$ is a distance from the radar device to a predetermined reflection point on the surrounding stationary object in which the reflected wave is reflected again.

4. The ghost removal method according to claim 1, wherein the target moving object is a preceding vehicle, and the surrounding stationary object is a wall or a guide rail.

5. The ghost removal method according to claim 1, wherein the estimated position of the ghost includes a position that is beyond the surrounding stationary object and that is not symmetrical with respect to the target object with the surrounding stationary object being located between the position and the target object.

6. A radar device comprising:
  a detection unit which detects a position and a relative speed of a target moving object, and a position of a surrounding stationary object, by using radio waves;
  a ghost estimation unit which estimates a position and a relative speed of a ghost based on the detected position and relative speed of the target moving object and the position of the surrounding stationary object, the ghost being generated at a position beyond the surrounding stationary object with respect to the target moving object when the radio waves reflected by the target moving object is reflected by the surrounding stationary object, wherein the position of the ghost is different than any position ever occupied by the target moving object; and
  a ghost removal unit which excludes a detected point at the estimated position and the relative speed of the ghost, from a candidate detection point of a moving object which is detected with radio waves.

* * * * *